Nov. 18, 1941.  G. ABEL  2,263,156
ELECTRIC TRANSMITTER
Original Filed April 5, 1940  2 Sheets-Sheet 2
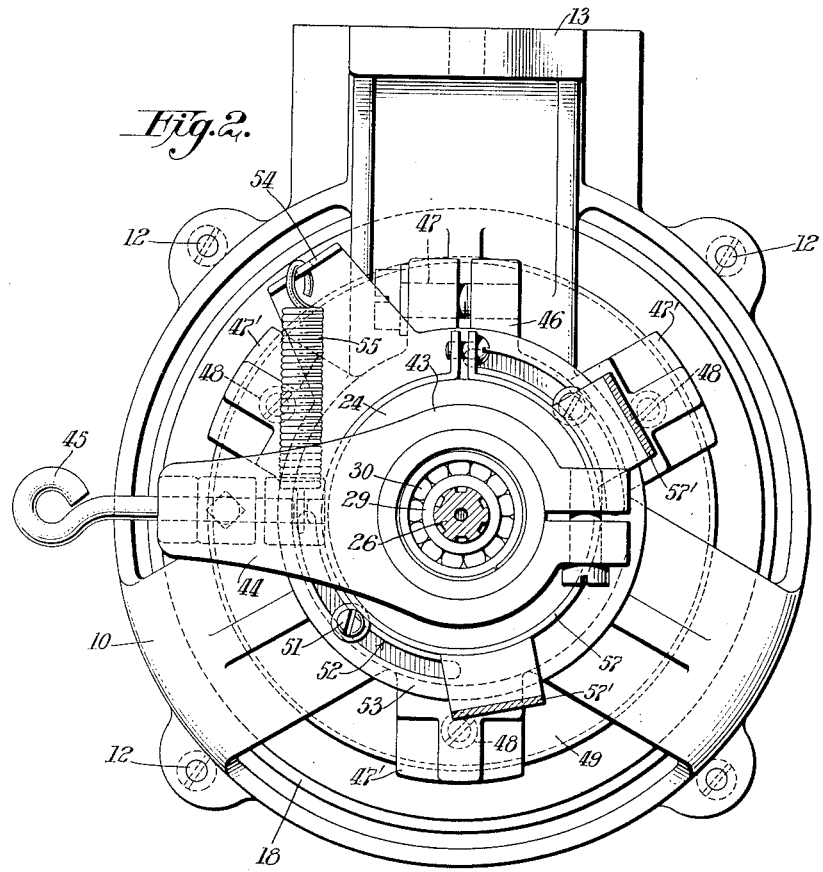
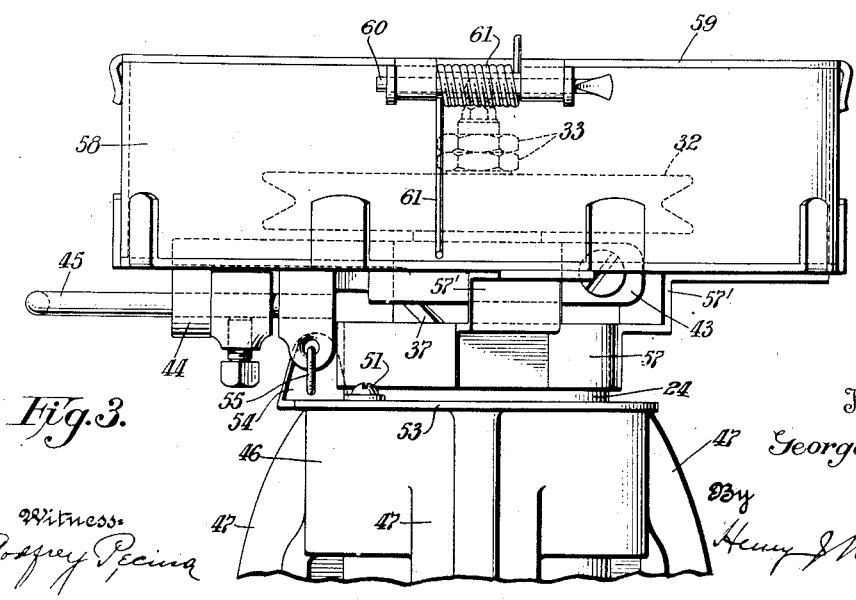
Inventor
George Abel Patented Nov. 18, 1941

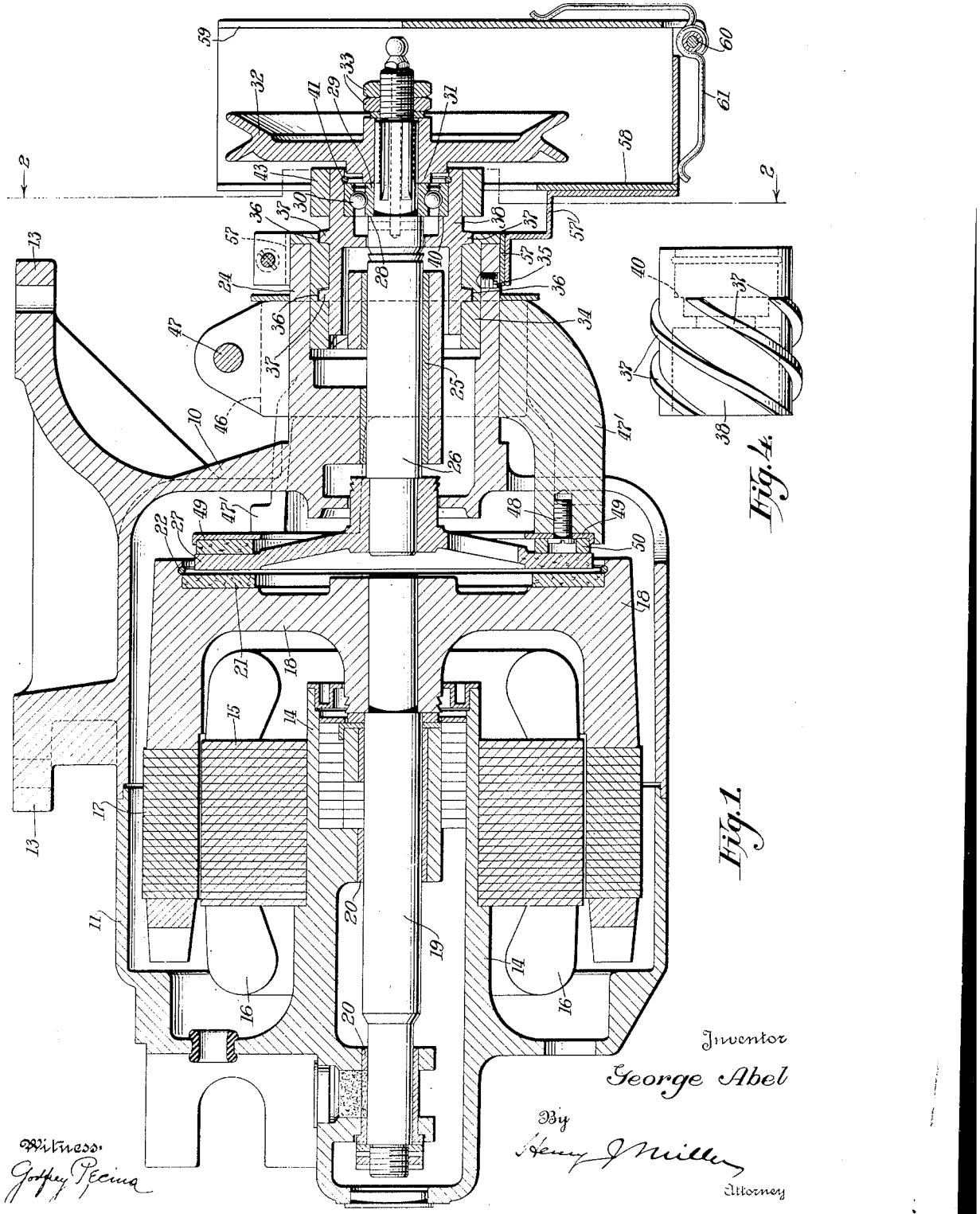

2,263,156

UNITED STATES PATENT OFFICE 2,263,156

ELECTRIC TRANSMITTER

George Abel, Plainfield, N. J., assignor to The Singer Manufacturing Company, Elizabeth, N. J., a corporation of New Jersey Substitute for abandoned application Serial No. 328,035, April 5, 1940. This application April 15, 1941, Serial No. 388,659

3 Claims. (Cl. 192—18)

This application is a substitute of my application Serial No. 328,035, filed Apr. 5, 1940 which now stands abandoned.

This invention relates to driving devices, and more particularly to a combined motor and clutch which is adaptable for driving sewing machines and the like where quick starting and stopping of the machine is essential.

One of the objects of this invention is to provide improved means for moving the driven element into and out of engagement with the driving element and the brake element.

Another object of this invention is to provide improved means for adjusting the brake element relative to the driving element.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings, Fig. 1 is a vertical section taken through the center of the transmitter.

Fig. 2 is an end elevation taken substantially along the line 2—2 of Fig. 1.

Fig. 3 is a bottom plan view of the right end of the transmitter shown in Fig. 1.

Fig. 4 is a detail view of the sleeve for shifting the stub-shaft axially.

In the embodiment selected for illustration, the transmitter housing is formed in two parts, 10 and 11, which are held together by the screws 12 (Fig. 2) to form a hollow cylindrical frame, part 10 being formed with feet 13 which are adapted to be secured to the under side of a sewing machine table or the like. The part 11 is formed with an inwardly extending central tubular portion 14 on which is tightly fitted a stationary electro-magnetic element 15 having the usual four-pole three-phase winding 16.

The rotary electro-magnetic member of the motor is disposed externally of the stationary member 15 and comprises the ordinary ring-type squirrel-cage rotor 17, which is secured to a spider 18, rigidly fixed to a shaft 19, which is journaled in suitable bearings 20 carried by the tubular portion 14.

The external rotor 17 and spider 18 are, in effect, a fly-wheel and the spider 18 carries a friction disk 21 which is held in a suitable depression in the spider by means of a split-ring 22.

The member 10 is formed with a laterally extending hub portion 24 which carries a bearing sleeve 25. An endwise movable stub-shaft 26 is rotatably journaled in the bearing 25 and has rigidly secured to one of its ends a disk-shaped driven clutch member 27. The other end of the shaft is formed with a shoulder 28 which is adapted to be engaged by the inner race member 29 of a ball-bearing 30. The inner race 29 is held against the shoulder 28 by the hub 31 of a pulley 32, the pulley 32 being keyed to the shaft and held thereon by means of the nuts 33.

In order to move the stub-shaft endwise, there is provided a bushing 34 which is held in the hub 24 by means of the set-screw 35. This bushing is formed with internal cam-grooves 36 into which fits the helical thread or rib 37 on a sleeve 38 having a shoulder portion 40 which engages the outer race of the ball-bearing 30. A split-ring 41 fits into a suitable groove in the sleeve 38 for the purpose of preventing lateral displacement of the outer race relative to the sleeve 38. Surrounding the sleeve 38, on the portion which extends beyond the end of the bearing hub 24, is the split hub 43 of an actuating lever 44 which is adapted to be connected through the eye 45 to a treadle mechanism of the usual and well-known type.

Embracing the outer cylindrical surface of the hub 24 is a split-hub 46, which is adapted to be drawn together by means of the screw 47, and this hub is formed with three laterally extending arms 47' which extend through suitable openings in the member 10 and have secured to their outer ends, by the screws 48, a sheet-metal plate 49 which carries a friction brake ring 50. It will be obvious that by backing off the screw 47 the brake member may be shifted along the outer surface of the cylindrical hub 24 until its desired position is reached and then, by tightening the screw 47, the brake member will be locked in its adjusted position.

From the foregoing it will be seen that, by moving the lever 44, the sleeve 38 will be turned and this turning movement, due to the action of the cam-groove 36 and the rib 37, will cause the sleeve 38 to move endwise relative to the bushing 34. Endwise movement of the sleeve 38 is imparted, through the ball-bearing 30 which is of the deep-grooved type, to the stub-shaft 26 thereby causing the driven clutch element 27 to engage the friction disk 21 carried by the driving element 18. It is obvious that the reverse movement of the lever 44 will cause the stub-shaft to move in the opposite direction to declutch the driving and driven elements and force the driven element 27 into engagement with the stationary brake disk 50.

Adjustably secured to the hub 46 by means of the screws 51 and slots 52 is a disk 53 having an upwardly extending arm 54 to which one end of a spring 55 is secured, the other end of the spring being fixed to the lever 44 for the purpose of constantly urging it in a direction to cause the driven element 27 to engage the brake.

To the outer end of the hub 24 there is clamped a sheet-metal band 57 formed with arms 57' which carries a U-shaped belt and pulley-guard 58, the pulley-guard having a front portion 59, which is hinged at 60 and constantly urged to the position shown in Fig. 1 by means of the spring 61. The purpose of this construction is to permit the member 59 to be lowered for the purpose of replacing the belt or pulley 32.

Having thus set forth the nature of the invention, what I claim herein is:

1. In an electric transmitter a casing formed with a hub, an axially movable stub-shaft journaled in said hub and having a driven element fixed to one of its ends, a driving element located within the casing, a member adjustably secured to the outer surface of the hub and having fingers which extend into said casing, a brake ring carried by said fingers in a position to be engaged by said driven element, and means for axially shifting said shaft to cause the driven element to engage either the driving element or the brake.

2. In an electric transmitter a casing formed with a hub, an axially movable stub-shaft journaled in said hub and having a driven element fixed to one of its ends, a driving element located within the casing, a member embracing said hub and adjustably secured thereto and having a portion extending into said casing, a brake-element secured to the portion of the member located within said casing, and means for axially shifting said stub-shaft to cause the driven element to engage either the driving element or the brake-element.

3. In an electric transmitter a casing formed with a cylindrically shaped exterior hub, an axially movable stub-shaft journaled in said hub, a driven element secured to one end of said shaft, a driving pulley secured to the other end of said shaft, a rotary driving element located within the casing and having its axis of rotation in axial alignment with the stub-shaft, a brake member carried by the outer surface of said cylindrical hub and adjustable longitudinally thereon, said member having a portion which extends into said casing, a friction element carried by the portion of the member within the casing, and means for axially shifting said stub-shaft to cause the driven element to engage either the driving or brake element.

GEORGE ABEL.